Figure 1:
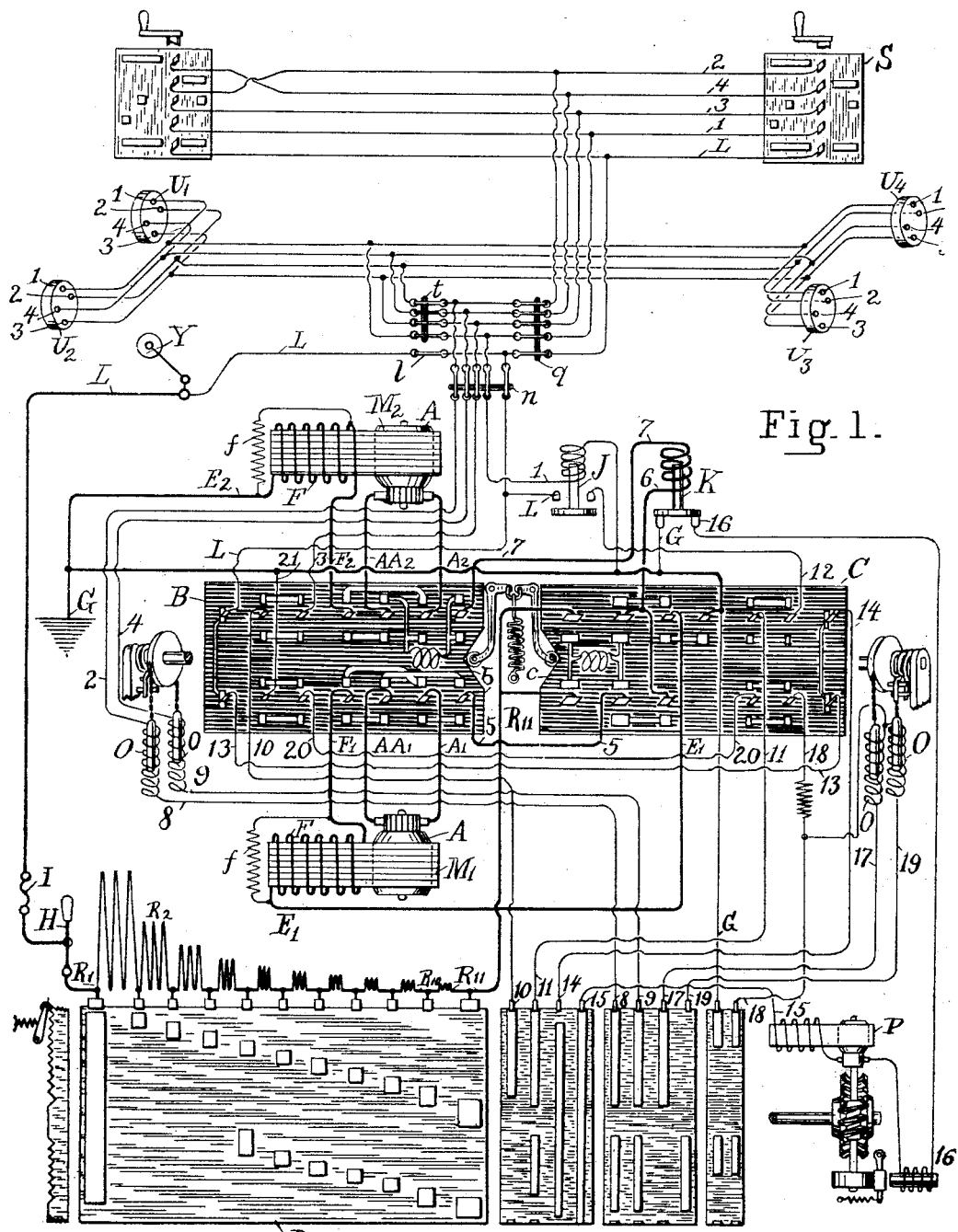

No. 696,880. Patented Apr. 1, 1902.
F. J. SPRAGUE.
TRACTION SYSTEM.
(Application filed Dec. 16, 1898.)
(No Model.) 8 Sheets—Sheet 2.

Witnesses:
Samuel W. Balch
Eugene R. Carichoff

Inventor,
Frank J. Sprague,
by Thomas Ewing, Jr.,
Attorney.

No. 696,880. Patented Apr. 1, 1902.
F. J. SPRAGUE.
TRACTION SYSTEM.
(Application filed Dec. 16, 1898.)
(No Model.) 8 Sheets—Sheet 3.
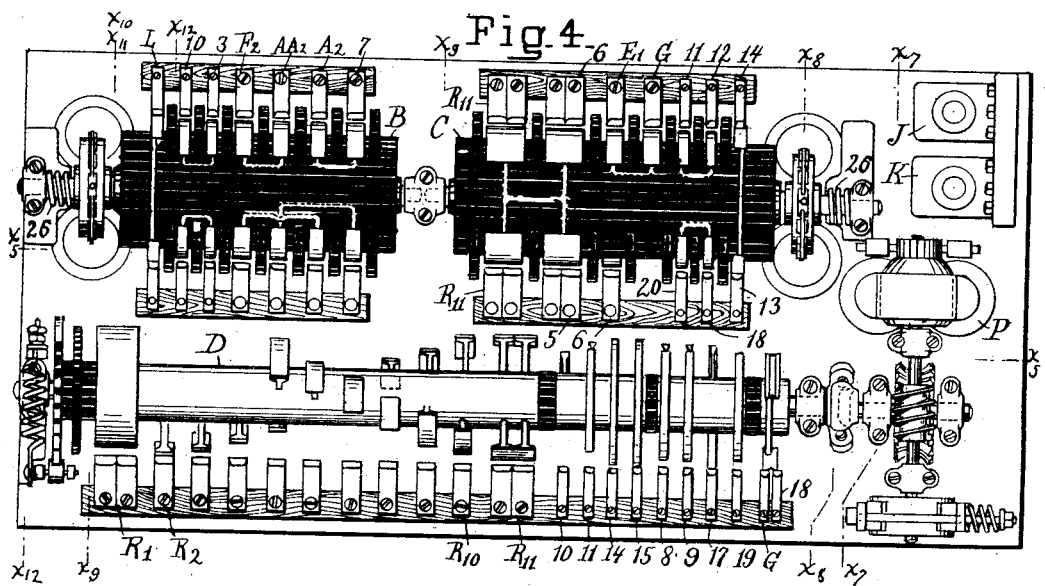
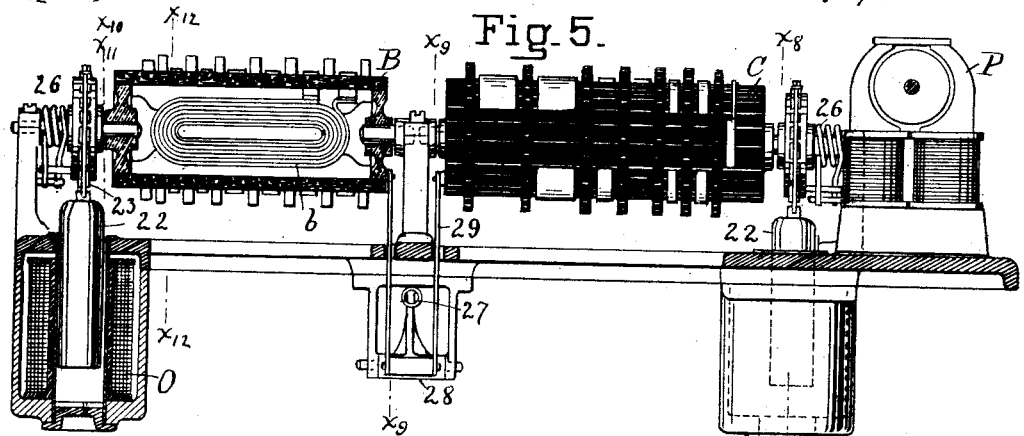
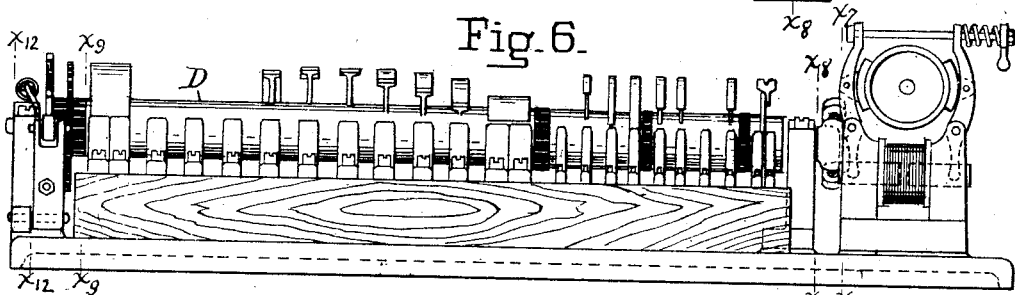
Witnesses:
Samuel W. Balch
Eugene R. Caincroff
Inventor,
Frank J. Sprague
By Thomas Ewing Jr.,
Attorney No. 696,880. Patented Apr. 1, 1902.
F. J. SPRAGUE.
TRACTION SYSTEM.
(Application filed Dec. 16, 1898.)
(No Model.) 8 Sheets—Sheet 4.

Witnesses:
Samuel W. Balch
Eugene R. Carichoff

Inventor
Frank J. Sprague
By Thomas Ewing, Jr.,
Attorney.

No. 696,880. Patented Apr. 1, 1902.
F. J. SPRAGUE.
TRACTION SYSTEM.
(Application filed Dec. 16, 1898.)
(No Model.) 8 Sheets—Sheet 5.
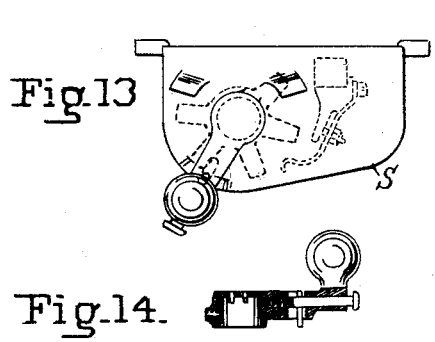
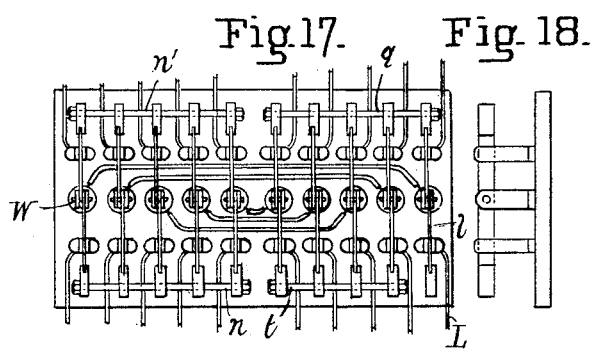
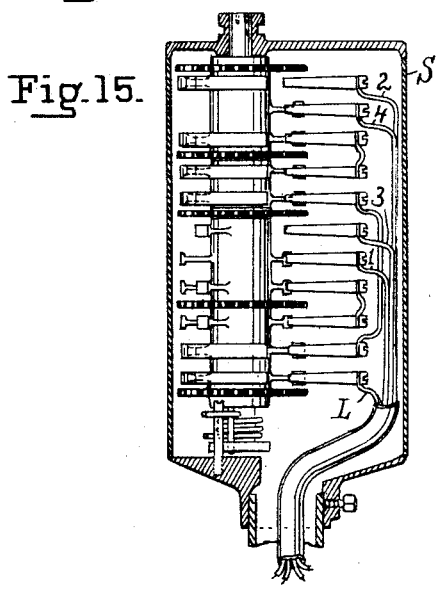
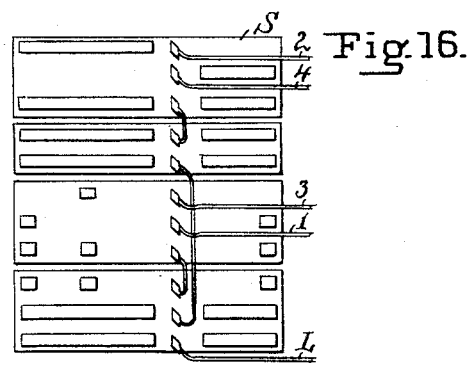
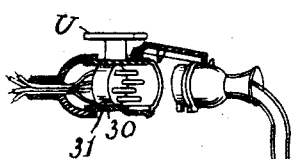
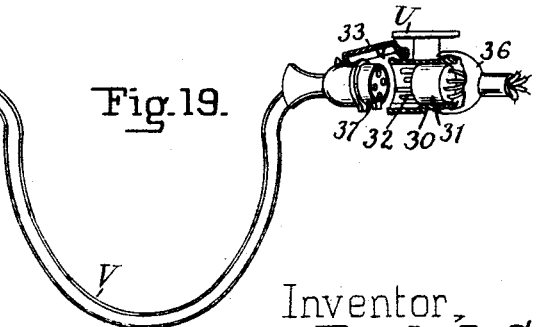

No. 696,880. Patented Apr. 1, 1902.
F. J. SPRAGUE.
TRACTION SYSTEM.
(Application filed Dec. 16, 1898.)
(No Model.) 8 Sheets—Sheet 6.
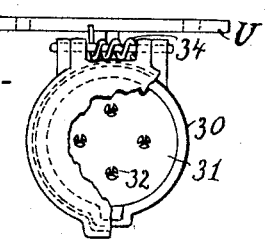
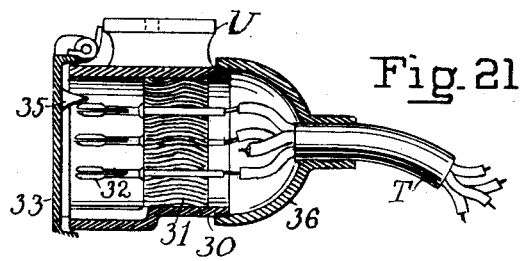
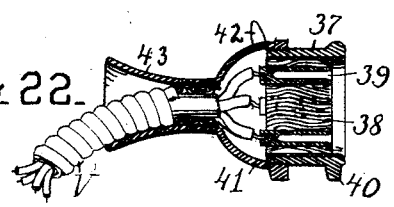
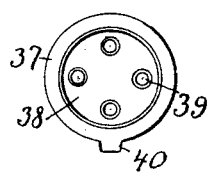
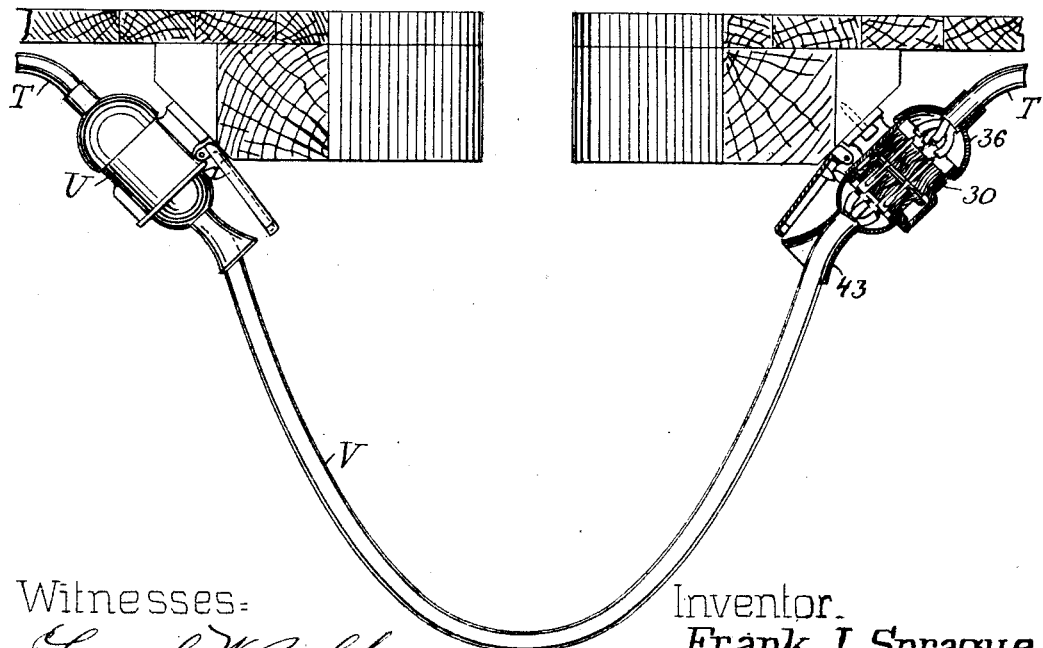
Witnesses:
Samuel W. Balch
Eugene R. Carichoff
Inventor.
Frank J. Sprague
by Thomas Ewing, Jr.
Attorney.

No. 696,880.  
F. J. SPRAGUE.  
TRACTION SYSTEM.  
(Application filed Dec. 16, 1898.)  
(No Model.)  
Patented Apr. 1, 1902.  
8 Sheets—Sheet 8.

Witnesses:  
Samuel W. Balch  
Eugene R. Carichoff

Inventor,  
Frank J. Sprague.  
by Thomas Ewing Jr.,  
Attorney

UNITED STATES PATENT OFFICE.

FRANK J. SPRAGUE, OF NEW YORK, N. Y., ASSIGNOR TO THE SPRAGUE ELECTRIC COMPANY, A CORPORATION OF NEW JERSEY.

TRACTION SYSTEM.

SPECIFICATION forming part of Letters Patent No. 696,880, dated April 1, 1902.

Application filed December 16, 1898. Serial No. 699,454. (No model.)

*To all whom it may concern:*

Be it known that I, FRANK J. SPRAGUE, a citizen of the United States of America, and a resident of the borough of Manhattan, in the city, county, and State of New York, have invented certain new and useful Improvements in Traction Systems, of which the following is a specification.

The invention is an improvement upon the system described and claimed in my United States Patent for improvements in traction systems, No. 660,065, granted October 16, 1900. Many of the features are not limited to a purely electrical equipment, but the system actually employed is electrical; and, viewed in this specific aspect, it consists in its general features, as does that of the other application, of a train system made up of car systems and a train-line. There are one or more motor equipments, each with one or more motors on each car, a reverser-switch, a current-varying controller, which includes a rheostat, and usually a series-multiple switch for each motor equipment, and one or more operator's switches or master-controllers, with instrumentalities on the different cars for operating these devices, and train connections whereby a train of cars may be made up of any desired number of cars in any desired order or end relation and the entire system be operated as a unitary system from any operator's switch.

The main features of invention in this system, which constitute also the main differences between it and the system of the other application, are the following:

First. A rheostat-cylinder which operates in one direction only, with or without means for giving to this cylinder an interrupted or a step-by-step movement, or both.

Second. A rheostat combined with an independently-mounted and independently-movable series-multiple switch whether the rheostat be movable in only one direction or not and with or without the means recited above under heading "First." To this combination may also be added an independently-mounted and independently-movable reverser-switch.

Third. A rheostat having upon it or operating in conjunction with it a switch which determines the continuity of circuits which operate a reverser-switch or a series-parallel switch, or both, or determine the relation of the rheostat, reverser-switch, and series-multiple switch, or any two of them. By means of the combination here outlined it becomes possible in this system to effect with four train-wires substantially everything effected in the more elaborate form of the system shown in the other application with five train-wires, one speed-determining wire of the old combination being dropped. According to this present invention the rheostat in this combination may be operated by a pilot-motor, there being a limit-switch for the pilot-motor and a circuit-changing switch for the series-parallel switch or the reverser-switch, or both.

Fourth. Means for opening the reverser-switch or series-multiple switch, or both, independently of the position of the rheostat, with or without means, such as a cut-out switch on the rheostat for preventing the closure of the reverser-switch or the series-multiple switch, or both, except in certain positions of the rheostat.

Fifth. Independent series-multiple and reverser switches having both like or opposed movements relative to each other with or without automatic return to open-circuit position and with or without a rheostat having a like automatic return to open position.

Sixth. Various other combinations of these devices into unitary devices.

Seventh. The method of operating the reverser-switch, series-multiple switch, and the rheostat, whereby the circuit is opened in passing from series to multiple position.

Eighth. A permanent shunt to the field of a series motor, particularly one having a laminated field and especially in combination with the circuit-changing devices, to hold the field and reduce the arc in breaking the circuit.

Ninth. A three-way cut-off between the train-line, the operator's switches, and the governing system on each car, whereby any one of these elements can be cut off without disconnecting the other two, and whereby both the governing system and the operator's switches can be cut off without impairing the train-line.

Figure 2:
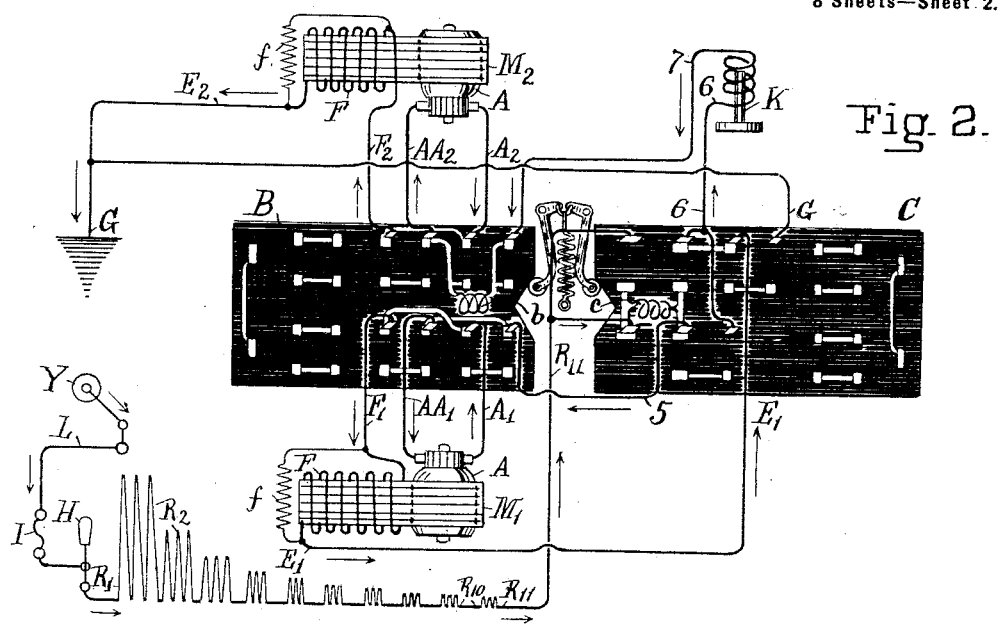
Figure 3:
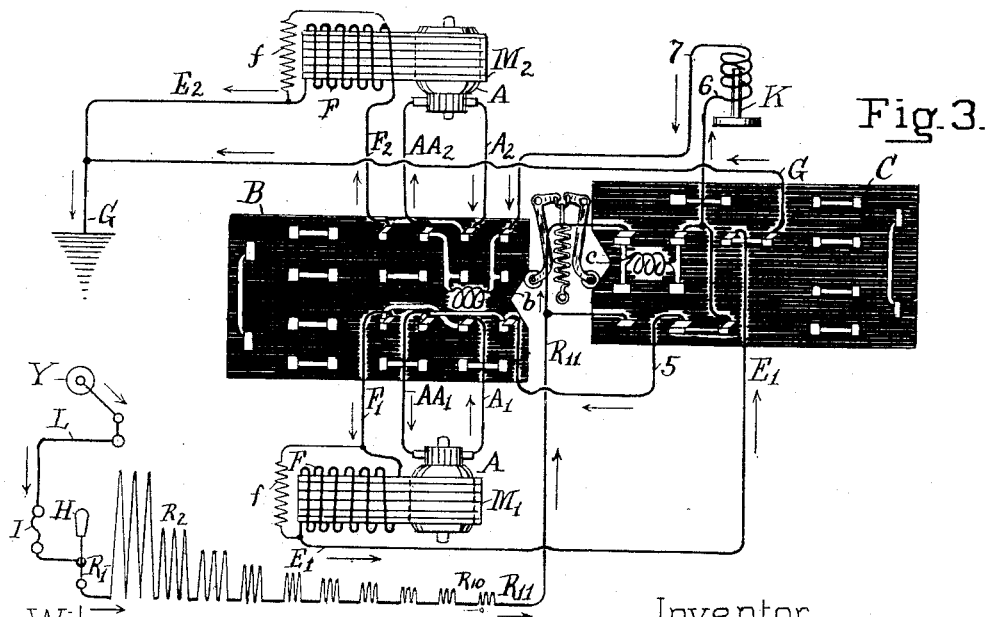
Figure 7:
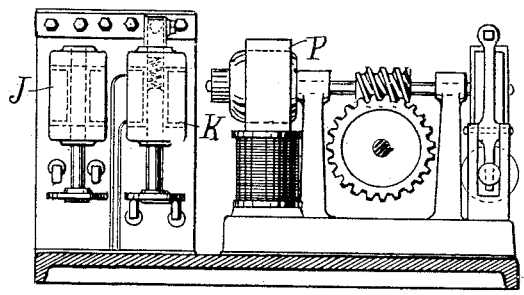
Figure 8:
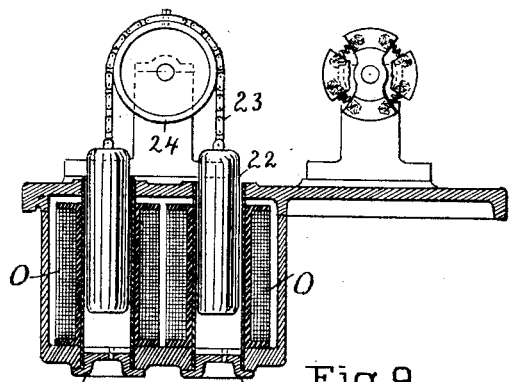
Figure 10:
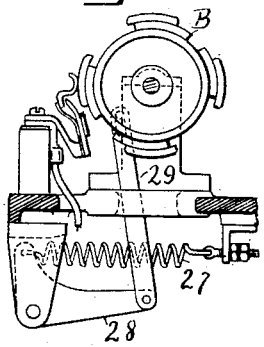
Figure 9:
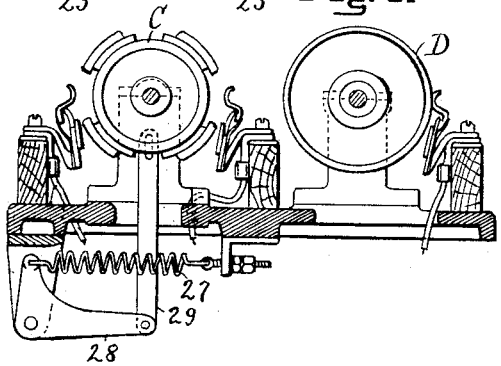
Figure 11:
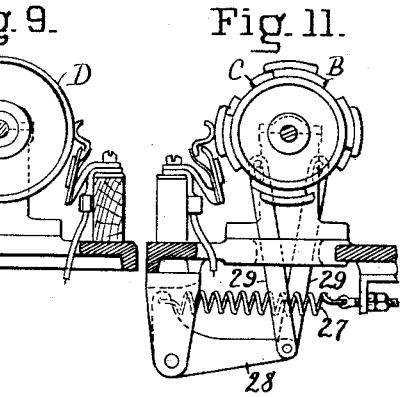
Figure 12:
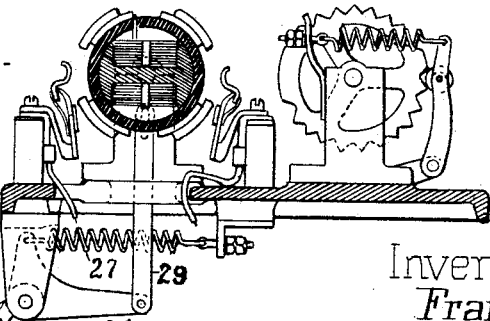
Figure 25:
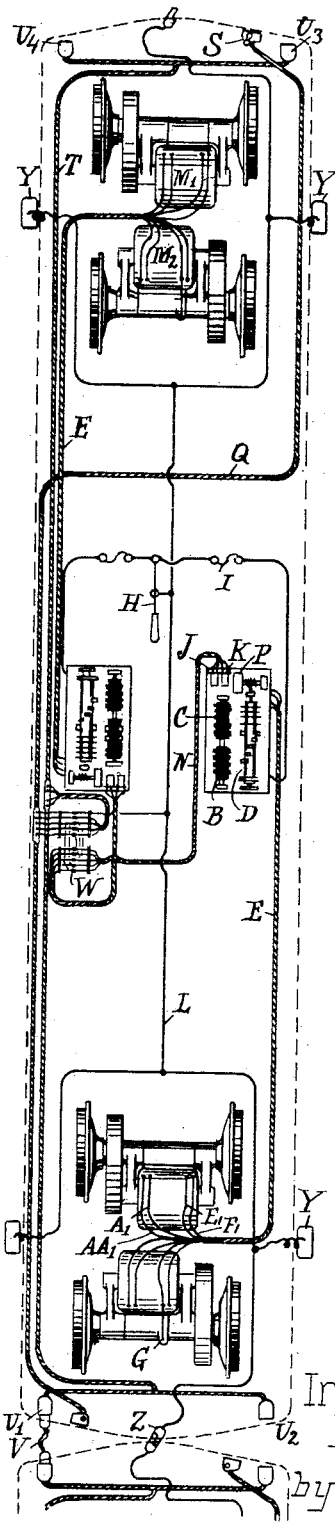
Figure 26:
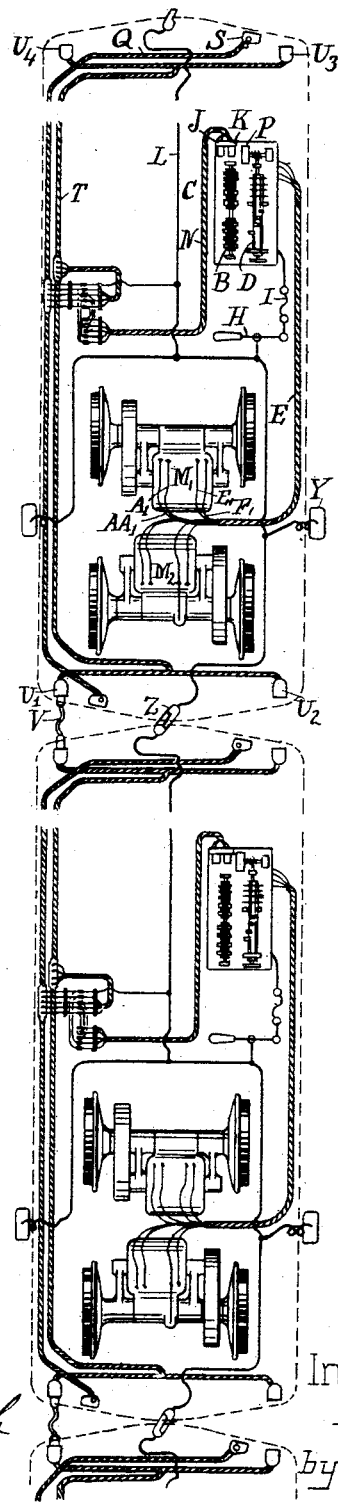

In the accompanying drawings, which form a part of this specification, Figure 1 is a diagram of the circuits of a complete car equipment with one motor equipment, with the parts in the open or "off" position. Fig. 2 is a diagram of the circuits of a motor equipment with the reverser-switch and series-multiple switch positioned to effect the connection of the motors in series for movement of the car forward or ahead. Fig. 3 is a diagram of the circuits of a motor equipment with the reverser-switch and the series-multiple switch positioned to effect the connection of the motors in multiple for movement of the car forward or ahead. Fig. 4 is a plan view of the current-varying controller, the reverser-switch, the means for moving them, the throttle, and a relay in one of the governing-wires. Fig. 5 is a vertical section on the line $x^5 x^5$ of Fig. 4, showing the reverser-switch, series-multiple switch, the means for moving these switches, and pilot-motor. Fig. 6 is an elevation showing the rheostat of the current-varying controller, the limit-switches, and the brake mechanism of the pilot-motor. Fig. 7 is a vertical section on the line $x^7 x^7$ of Fig. 4, showing the relay for one of the governing-wires, the throttle, and the pilot-motor, its brake and gearing. Fig. 8 is a vertical section on the line $x^8 x^8$ of Fig. 4, showing the magnets for operating the series-multiple switch and the yielding coupling, through which the rheostat-cylinder and the limit-switches are driven by the pilot-motor. Fig. 9 is vertical section on the line $x^9 x^9$ of Fig. 4, showing the series-multiple switch, the rheostat-cylinder, and the spring connections for returning both the reverser-switch and the series-multiple switch to open or off position. Fig. 10 is a vertical section on the line $x^{10} x^{10}$ of Fig. 4, showing the reverser-switch and series-multiple switch operated in the same direction and the spring connections for returning both switches simultaneously to open or off position. Fig. 11 is a vertical section showing the same parts as are shown in Fig. 10, but with the reverser-switch and series-multiple switch operated in opposite directions. Fig. 12 is a vertical section on the line $x^{12} x^{12}$ of Fig. 4, showing the reverser-switch and series-multiple switch in open position and the spring for returning both switches simultaneously to open position. Fig. 13 is a top view of the operator's switch or master-controller. Fig. 14 is a vertical section through the handle of the operator's switch or master-controller. Fig. 15 is a vertical section through the casing of the operator's switch or master-controller. Fig. 16 is a development of the cylinder of the operator's switch or master-controller and a diagram of the connections. Fig. 17 is a plan view of a group of switches for connecting the operator's switch-line, the train-line, and the local governing-wires with each other. Fig. 18 is an elevation of the group of switches illustrated in Fig. 17. Fig. 19 is a perspective view of a jumper and couplings therefor. Fig. 20 is an end view, with the cover partly broken away, of the part of the coupling which is attached to the car. Fig. 21 is a vertical section through the part of the coupling shown in the preceding figure. Fig. 22 is a vertical section through the part of the coupling which forms each end of the jumper. Fig. 23 is an end view of the part of the coupling shown in the preceding figure. Fig. 24 shows the couplings under the abutting platforms of two cars and the connecting-jumper, with the preferred manner of attaching them to the car. Fig. 25 is a plan view of one car and the end of an abutting car, the car fully shown being provided with two complete equipments in which the various parts, with the exception of the switches and cables of connecting-wires, are shown in substantially their true proportion and position. Fig. 26 is a similar view showing two cars and the end of a third connected in a train, the first two cars being broken away and each provided with one complete equipment.

The train system comprises—

*First—Car-motor circuits.*—These include between the source of supply L and ground G a main or working motor or motors M' M² on each car, which will be termed a "motor equipment;" a controller having three parts, viz: a reverser-switch B, a series-multiple switch C, and a rheostat D; a hand-switch H for opening the motor-circuits, a safety-fuse I, and a throttle-coil K. The reverser-switch, series-multiple switch, and rheostat are all independently mounted and independently movable. The series-multiple switch and rheostat are called, collectively, the "current-varying controller." Cables E carry the wires between the reverser and current-varying controller and the motor equipment. If there are four motors on each car, these are preferably grouped in two motor equipments with independent car-circuits.

*Second — The local governing-wires.*— These include wires on each car gathered in a cable N, from which they lead to coils O O of the relay-magnets or solenoids for operating the reverser-switch and series-multiple switch and to the pilot-motor P for operating the rheostat-cylinder and switches attached thereto and through contacts on the reverser-switch and series-multiple switch. One of the local governing-wires instead of being connected, as above indicated, leads to the coil of a relay J.

*Third—The operator's switch-line.*—This is a cable Q, carrying wires for connecting contacts of the operator's switches S on each car, of which switches there are preferably two, one on each platform. If there is but a single car, this cable becomes a part of the governing-circuits, and in a train the cable connected with the operator's switch in use is a part of the governing-circuits, through which all of the instrumentalities of the train system are governed or controlled.

*Fourth—The train-line.*—This is the continuing-cable T, with a number of governing-wires running from car to car of the train. It is made up of the permanently-placed sections of the train-line on the several cars and the couplers U and jumpers V for connecting these sections of the train-line. On each car are groups of switches W, each switch in each group being connected with a corresponding switch in each of the other groups. One group of five switches $q$ closes to the wires of the operator's switch-line, a group of four switches $t$ closes to the wires in the train-line, a single switch $l$ connects to the source of supply, a group of five switches $n$ connects to the local governing-wires of the car equipment, and in the event of there being two independent car equipments another group of switches $n'$ connects to the local governing-wires of the other car equipment. In practice the current is taken from a third rail to each car through shoes Y, which are carried by each truck. All the shoes are united by the line-wire L. In order to guard against interruption of the circuit in any car, through the jumping of the shoes on one car while current remains on the other cars, thus permitting the control mechanisms on the several cars to become differently positioned, the line-wires on the several cars are connected by couplers Z. The operator's switch-line and the train-line may evidently be common to cars which are equipped with motors and to cars which are not equipped with motors. Together they constitute means for transmitting an initial governing impulse from any one of a number of points to all of the motors or motor equipments on the train.

The system, like that described in the application above mentioned, is what I have called a "multiple-unit" system for operating railway-cars. By this is meant a system according to which the cars are so equipped that each can be operated by itself or in a train made up of equipped cars or can be used as a locomotive-car to draw a train of unequipped cars or can be connected up with cars partially equipped, for example, as above indicated, with the train-line and one or more operator's switches, so that the fully-equipped car can be placed anywhere in the train and the train be operated from any desired operator's switch. In a word, the train can be made up wholly of fully-equipped cars, or of fully and partially equipped cars, or of fully-equipped and unequipped cars, or of fully and partially equipped and unequipped cars. The cars are so equipped as to make them interchangeable, so that, as above stated, they can be grouped in any number and order and irrespective of what are the abutting ends and so that the train can be operated from any selected platform. Suitable provision is also made in the groups of switches above described for isolating any car system without thereby disturbing the train connections or the operation of the train system as a whole from either of the operator's switches on any car, including the car whose system is isolated.

The general operation will first be stated, and the exact circuit connections and construction of apparatus will then be taken up and described in detail.

*The car.*—The operator's switches are placed upon the platforms, preferably at diagonally opposite sides of the two platforms. This is the ordinary practice; but they can be placed elsewhere in the car and be operated by devices placed on the platforms and mechanically connected with them. Such variation is obviously a matter of convenience, and the system will be discussed on the supposition that there is an operator's switch or master-controller on each platform. They are each provided with contacts for causing the train to move forward or back. When one of the operator's switches is closed at the forward or "ahead" contact, as that term is used here, the car will move along the track with that platform in front on which the switch that is being operated is located. When a switch is closed at the "back" contact, as that term is used herein, the car will move with the platform in the rear on which is located the switch that is operated. These terms are selected with reference to an operator standing with his hand on the handle of the operator's switch on either platform and looking at the track, the terms "ahead" and "back" being relative to the facing direction of the operator, although the actual track movement produced by closing the ahead contact or the back contact of the switch on one platform of a car is opposite to that produced by closing the similarly-named contact of the switch on the other platform of the same car. Further, the two platform-switches are alike and are similarly positioned with respect to the platform on which they are located, and the contacts are so disposed that an operator standing at either switch and facing the track will move his hand, say, to the right to close the ahead contact and to the left to close the back contact of either switch, and the ahead contact of one switch is connected with the back contact of the other by a wire which is connected to one of the direction-controlling wires 2 or 4 of the system. It results from the observance of the conditions above named that like movement of the operator's hand on the switch-handle of either operator's switch on a car will close opposite reverser-contacts in the two switches and will result in like movement of the car relative to the operator stationed upon the platform, as above indicated.

*The train.*—This statement may be extended to all of the operator's switches on the train. In order that the cars may be properly coupled together, the section of the train-line that is on each car must be provided with couplings properly arranged, as hereinafter explained, so that the cars can be coupled without regard to number or sequence or end relation of any of the cars, and that like hand movement of the operator's switch at either end of any car will produce like track movement of the train relative to the operator standing upon the platform at the switch in use, although the actual movement of the train along the track may be reversed, as above explained, with reference to a single car; but if a car is turned end for end in the train, thus changing the end relation of that car with the contiguous car or cars, the rotation of the main motors thereon must be reversed in order that the direction of movement of the car which is turned end for end shall be the same as that of the rest of the train. This must be provided for in the arrangements for coupling the cars, because on some roads cars are run around a loop or go in and out of yards at different switches and in other ways become reversed on the main track, whereby different end relations of the cars result. No matter how the cars go together the corresponding controlling-wires of the several cars must be so coupled that if current is turned into any train-wire at any platform-switch it will cause the mechanism on each car of the train to operate in the same sense as that on the other cars relative to the speed and direction of travel of the train—that is, there must be reversible train connections for the governing systems of different cars. To effect this reversibility, the speed-controlling wires must be coupled together in the same way, irrespective of the end relation of any car in the train, and the reverser-wires of any car must be reversed in the train system when the car is turned end for end in the train. Therefore the terminals of the wires at the abutting ends of the cars must be properly paired, the pairing being secured by properly-positioned terminals, so that the connections of the speed-controlling wires will not be exchanged and the connections of the direction-controlling wires will be exchanged when the car is turned end for end, or the pairing may be secured by providing couplings of complementary shapes, the couplings at the terminal of either reverser-wire at either end of each car being like that of the other reverser-wire at the other end of the car. The result of thus properly coupling the cars where there is an operator's switch on each platform is that irrespective of sequence or end relation of the cars or their number there are two distinct directional train-wires, to each of which are connected the ahead contact of one operator's switch, the back contact of the next switch, the ahead contact of the third switch, the back contact of the fourth switch, and so on alternately throughout the train; but the order of alternation of these contacts is reversed in the two train-wires, one beginning with the ahead contact and the other with the back contact at each end of the train. If the conditions herein set forth are observed, like movement of the operator's hand at any operator's switch on the entire train will produce like directional movement of the entire train relative to the facing direction of the operator, although the actual movement of the train may be reversed.

The foregoing may be summed up briefly as follows: that in the operation of a single car or a train of cars from any point on the car or train like movement at any operator's switch will correspond to like relative track movement of the car or train.

*System of control.*—The car systems are usually and preferably identical, and each comprises one or more motor equipments, a controller comprising a current-varying controller and reverser for each motor equipment, and means for operating the controllers, including operators' switches, which from their function may be called "master-controllers" and from their preferred location may be called "platform-switches." These operators' switches are provided with two sets of contacts arranged symmetrically on opposite sides of a neutral or open-position line in the switch. There are (*a*) two contact-strips and a single contact-finger connected to the line-wire L and called the "line-contacts" for connecting the control system to the source of supply through the operator's switch, (*b*) two strips and two fingers making contact with wires 2 and 4, respectively, for operating the reverser-switch and the series-multiple switch, so as to connect the main motor to line in series relation through the rheostatic resistance, (*c*) two contact-strips and a single point for connecting through wire 3 to the pilot-motor, so that it shall cause the resistance of the rheostat to be cut out, but leaving the motors in series arrangement, and (*d*) a single contact-strip and a single point on the ahead side of the switch for connecting with wire 1 and operating relay J to change the connection of the motors from series to multiple and cutting out the resistance of the rheostat. This last point is preferably not duplicated on the other side of the switch, since it is not desirable that the operator be allowed to go back at full speed. In practice, as shown in Figs. 15 and 16, these contacts are multipled in series, so that the circuit is interrupted at several points whenever the switch is opened. The main motors are series motors; but in order to permit opening the circuit with full current on the field is provided with a shunt, through which it will discharge itself. This is highly important, especially if the fields be laminated, because the circuits are opened with full current on. The shunt usually takes about one-tenth of the current. When the operator's switch is closed at wire 2 or 4, the reverser-switch and series-multiple switch are thrown by throw-over coils to close the main-motor contacts for movement ahead or back with the main motors in series. If the operator's switch is then closed at wire 3, the pilot-motor is set in motion and moves the rheostat until the resistance thereof is cut out, if the contact to wire 3 is maintained long enough in the operator's switch. The circuit of the pilot-motor is then opened at the limit-switches and the pilot-motor stops. The apparatus remains in this condition, and the car or train moves according to this connection of the motors so long as nothing is disturbed. If the operator's switch is closed on wire 1, supposing it to have been closed on wires 2 and 3, the reverser-switch and series-multiple switch return to open position, opening the main-motor circuit. These switches are then set by throw-over coils O to connect the main motors for movement ahead with the motors in multiple, and the pilot-motor moves the rheostat in the same direction as before, cutting out all of the resistance of the rheostat. The pilot-motor circuit is then opened at the limit-switches and the pilot-motor stops. If after either of the above operations the operator's switch is opened or the line-current fails, the reverser-switch and series-multiple switch return to open position and the pilot-motor again moves the rheostat-cylinder in the same direction as before to open position, when the circuit of the pilot-motor is broken at the limit-switches and the motor stops. When the operator's switch is closed at wire 2, the circuit through the main motors is as follows, (see Fig. 2:) from the source through the hand-switch H and safety-fuse I, through the resistances $R'$ to $R^{11}$ of the rheostat to the series-multiple switch, thence through the blow-out coils $c$ within the series-multiple-switch cylinder, thence through wire 5 to contacts on the reverser-switch cylinder, through lead AA', the armature A of one of the motors M', back through lead A' to contacts on the reverser-switch, through lead F' to the field F and a shunt $f$, around the field of the motor M', thence through lead E' to contacts on the series-multiple switch, to wire 6, thence through the coil of the throttle K to wire 7, thence to a contact on the reverser-switch and through the blow-out coil $b$, connected therewith, thence through lead $AA^2$ to the armature A of the motor $M^2$, through lead $A^2$ to contacts on the reverser-switch, through the lead $F^2$ to the field F and a shunt $f$, around the field of motor $M^2$, through lead $E^2$ to ground. Should the operator's switch be closed on the other side at wire 4 for movement back with the main motors in series, the circuit is the same, except for the direction of the circuit through the armatures of the two motors, which will be reversed. Should the operator's switch be closed also at wire 3, the circuit through the motors remains unchanged, except that sections of the rheostat are cut out one after the other. As will be seen, these sections are of diminishing value, so as to maintain a uniform rate or percentage of decrease of resistance. When the operator's switch is closed at wires 2 and 1 for movement ahead with the motors in multiple, the switches will be brought into the position shown in Fig. 3. The main-motor circuits will then be from the source of supply through the resistance or around the resistance of the rheostat, through the series-multiple switch, thence through the blow-out coils $c$, beyond which the circuit divides. Through one branch the circuit is through wire 5 to contacts on the reverser-switch cylinder, through lead AA', the armature A of one of the motors M', back through lead A' to contacts on the reverser-switch, through lead F' to the field F and a shunt $f$, around the field of the motor M', thence through lead E' to contacts on the series-multiple switch, and thence to ground. The other branch can be traced to wire 6, through the coil of the throttle K to wire 7, thence to a contact on the reverser-switch and through the blow-out coil $b$, connected therewith, through lead $AA^2$ to the armature A of the motor $M^2$, through lead $A^2$ to contacts on the reverser-switch, through the lead $F^2$ to the field F and shunt $f$, around the field of the motor $M^2$, through lead $E^2$ to ground. It will thus be seen that the coil of the throttle is in circuit with only one of the motors when the motors are in multiple with each other. The governing circuits may now be traced throughout. They are as follows: When the parts are all in normal or open position, (shown in Fig. 1,) all circuits are open. When the circuit is closed at the operator's switch to wire 2 or 4 only, the circuit is then through one or the other of the relay-coils O of the reverser-switch, thence through the wires 8 or 9 to contacts of the circuit-changer, thence through one or the other of the coils O of the series-multiple switch by connections to be traced later. If the operator's switch is also closed on wire 3, connection is made at the reverser-switch through wire 10. If the operator's switch is closed on wire 1, contact is made through wire 11, thence through contacts on the series-multiple switch to wire 12, to contacts controlled by the relay J, to line. When both the reverser-switch and the series-multiple switch are returned to open position, wires 10 and 11 are open, but a circuit is closed from line through contacts on the reverser-switch to wire 13 and thence through a contact on the series-multiple switch to wire 14. Wires 10, 11, and 14 are connected with contacts on the limit-switch. The contacts of 10 and 11 are closed and the contact of 14 is open when the cylinder of the rheostat and the limit-switch cylinder are in off position. The circuit through this limit-switch from wire 10, 11, or 14 is through a continuous contact thereof to wire 15, thence through the field, armature, and brake-magnet of the pilot-motor in series to wire 16, thence through the contact of the throttle K to ground G. Returning now to the circuits through the coils O of the reverser-switch and wires 8 and 9, leading therefrom to contacts of an automatic circuit-interrupter and circuit-changer switch, the circuit will be continued in initial position through wire 17, one of the coils O of the series-multiple switch, called the "series coil," because it closes the series contacts of the main motors, thence through the wire 18 and cut-out switch to ground. For multiple position the circuit is through wire 19 and multiple coil O to ground. There is also another branch of wire 18 through a resistance to save current, through contacts on the series-multiple switch to wire 20, through contacts on the reverser-switch to wire 21, to ground. Though the reverser-wires 8 and 9 control the throw-over coils O of the series-multiple switch, the position of the circuit-changer switch determines which throw-over coil of the series-multiple switch is operated. This is because the two wires 8 and 9 are in effect merged in the circuit-changer switch. The connections of these wires in the circuit-changer switch renders it possible to close or release the reverser-switch and the series-multiple switch in either the same or opposite directions by making and breaking a single circuit.

The method of operation will now be fully stated. When an operator's switch is closed at either wire 2 or 4, the system being in the open or off position shown in Fig. 1, the circuit is closed through one of the coils O of the reverser-switch, thence through wire 8 or 9, through the circuit-changer contact 17, through the series-coil O of the series-multiple switch, through wire 18 and cut-out-switch contact to wire 19, and thence to ground. The reverser-switch cylinder is set for either ahead or back connection of the motors, and the series-multiple-switch cylinder is set for series connection of the motors. So long as this contact is maintained in the operator's switch and the line remains intact the train will continue to run uninterruptedly forward or back with the main motors in series. If contact is closed in the operator's switch, also on line 3, an additional circuit is closed through a contact of the reverser-switch to line 10, thence through a limit-switch contact to line 15, and through the pilot-motor and contacts of the throttle to ground. The pilot-motor will move the rheostat until the limit-switch contact is broken at wire 10, thus opening the pilot-motor circuit and stopping the rheostat with all the resistance cut out. Even though contact 3 should be opened, provided contact 2 or 4 is maintained, no change will take place. The train will continue to run in the same direction with the motors in series. Should it be desired to cut out only a part of the resistance instead of cutting it all out, the contact at 3 may be made and broken without maintaining it long enough to cut out the entire resistance of the rheostat; but if the contact 3 is maintained long enough the resistance is all cut out, as indicated, and the pilot-motor is automatically stopped—that is, is stopped independently of the operator's switch—by the breaking of the circuit of the pilot-motor at the limit-switch contact. Should the resistance be cut out too rapidly at any rheostat, so that the main motors get undue proportion of current or more current than they are intended to stand, the movement of the pilot-motor will be checked or stopped by opening the contacts of the throttle K. Should any change in the condition of the system be made, whether by the accidental breaking of the line or by opening the operator's switch or by closing the operator's switch at multiple contact—that is, on wire 1—the reverser-switch and series-parallel switch are returned to open position and the pilot-motor moves again in the same direction as before. The rheostat-cylinder and the reverser-switch and series-multiple switch are then brought to the desired position determined by the limit-switch and the circuit-interrupter. If the operator after having closed on wire 2 or 4 and 3 desires to go to full multiple position, he closes the operator's switch on wire 1, relay J is operated, and the line is closed through relay-contact 12 and through a contact of the series-multiple switch to wire 11, thence through limit-switch contacts to wire 15 and the pilot-motor. The pilot-motor begins to move and without disturbing the rheostatic connections breaks its own circuit at the limit-switch contact and momentarily stops. At the same time the circuit through the coils of the reverser-switch and wire 8 or 9 and through wire 17 and the coil of the series-multiple switch is opened at the circuit-changer contacts. Centering-springs return the cylinders of the reverser-switch and series-multiple switch to open position, thus breaking the main circuit and at the same time closing the circuit of the pilot-motor through a contact of the reverser-switch, wire 13, a contact of the series-multiple switch, wire 14, a limit-switch contact, and wire 15. The pilot-motor then begins to move again and moves the limit-switches and rheostat until circuit is again made through wire 11 and through limit-switch contacts to the pilot-motor. This restores control of the pilot-motor to the operator's switch at the multiple contact and also closes a contact at wire 8 or 9 and wire 19, thus operating coils O of the reverser-switch and series-multiple switch. These switches are then set for multiple position and movement ahead or back, according as wire 2 or 4 is closed. At the same time the pilot-motor circuit through wire 14 is opened at both of these switches. The pilot-motor continues to run under the influence of the circuit, which includes wire 11, cutting out the resistance of the rheostat until the operator's switch is opened at wire 1 or the corresponding circuit through the pilot-motor is broken automatically at the limit-switch contact of wire 11. The throttle operates as before. It will be seen that the throttle operates to control the advance movement not alone of the rheostat but of the controller as a whole, including the circuit-changer 8, 9, 17, and 19. If again for any reason the governing-line is opened, either by accident or at the operator's switch, the reverser-switch and series-multiple switch return to open position, thus breaking the main-motor circuit and closing the pilot-motor circuit through wire 14. The pilot-motor then runs until the rheostat-cylinder is brought to open position, when the circuit is automatically broken at the limit-switch contact of wire 14. It will be seen from the statement of the operation of the automatic circuit, which includes wire 14 and which operates the pilot-motor independently of the operator's switch, that this controls the pilot-motor through contacts on the reverser-switch and series-multiple switch and is therefore dependent on these switches, but does not affect the operation of either. The cut-out switch connected with wires 18 and 19 is closed only when the rheostat-cylinder is at or near open or off position and when it is at or near the beginning of the multiple position. If control is for any reason lost at the operator's switch when the cut-out switch is open, it cannot be restored until the pilot-motor has operated and effected the closure of the cut-out switch.

It will be noted by reference to the above description that there are a pair of controlling-conductors for determining direction of movement and a pair of controlling-conductors for determining grouping of the car-motors, that either one of the reverser-conductors can be put in series with either one of the motor-grouping conductors, that neither pair of conductors can be put into series with either or both wires of the other pair of conductors simultaneously, and that circuit changers and interrupters, part hand-operated and part automatically operated, are provided to insure proper coöperation of the various devices. It will also be noted that from the reverser-actuating coils I provide alternative paths to ground, one of them controlled by the reverser. In the form shown one of these paths is through contacts on the reverser-switch, which are included in the wires 20 and 21, being separated at the series-multiple coils, and this path includes contacts controlled by the series-multiple switch. Another path is made by the wires 18 and 19, and this path is broken after movement of the reverser. It will, moreover, be seen that the reverser-switch is a normally opened circuit-breaker placed in the motor-circuit in series with the series-multiple switch, the actuating-coils for the two switches being in series in a common controlling-circuit, and that contacts are provided such that when the controlling-circuit is broken to effect change in the grouping of the motors the main-motor circuit is broken not only at the series-multiple switch, but also at the reverser. The main-motor circuit is, however, not broken at the rheostatic contacts, so that throw of the reverser and series-multiple switches to either of their working positions effects an immediate closure of the working circuit with resistance to control the motors. As the reverser and series-parallel switches are thrown on the initial movement of the master-controller the motors are thus immediately placed in circuit for slow movement in shifting and switching, the resistance of the motor-circuits being subsequently reduced on the continued movement of the master-controller.

*The reverser-switch and series-multiple switch.*—Each of these is a hollow cylinder, of insulating material, on which are suitably-disposed contacts. Each is rotated about an eighth of a revolution in either direction from a middle position in which the main contacts are broken. This rotation from middle position is effected by means of throw-over coils O. Iron plungers 22 are attracted into one or the other of these coils, accordingly as the one or the other is energized, and the cylinder is thus rotated in the one direction or the other. Chains 23 lead from the plungers to a pulley 24 on the shaft of the switch-cylinder. The coils are inclosed in an iron casing, which is bored opposite the ends of the coils to receive brass tubes, which pass through the coils and in which the plungers operate. Iron plugs 25, with flanges for attaching them to the frame, are fitted into the lower ends of the brass tubes. The magnetic circuit is thereby nearly completed through iron around and through the center of each of the coils by the frame, plugs, and plunger and is broken chiefly between the bottoms of the plungers and the plugs. Compression of air under the plungers prevents a too-rapid movement; but there is a small vent through each of the plugs to allow the air to escape, so that the plungers can be drawn fully into the coils without noticeable delay. Each of the switch-cylinders is returned to its middle position by two springs. One of these will be termed the "centralizing-spring" 26. It is coiled around the shaft of the switch, and its two ends lie on either side of two pins, one of which is carried with the switch-cylinder eccentrically to its axis and the other of which is fastened to the frame. This spring acts with substantially uniform force throughout the entire extent of movement of the switch from its full movement in either direction to middle position. At the middle position both ends of the spring rest against the pin in the frame and hold the switch in this position. Its strength must be within the power of the magnets to overcome when the plungers are up and the attractive power is a minimum.

It is desirable that there should be more force to start each cylinder when it is to be returned than is afforded by the centralizing-spring, and a second spring, which will be termed the "starting-spring" 27, is added. This operates through a bell-crank lever 28 and a link 29, one end of the link being attached to the bell-crank lever and the other to a pin which is carried by the switch-cylinder eccentrically to its axis. When the cylinder is near or at its middle position, the starting-spring exerts little or no force on the cylinder, because the link through which the force is applied lies nearly in a radial line to the cylinder, so that the magnets in operating the cylinder have at first only to overcome the centralizing-spring. When the cylinder is fully operated, the starting-spring exerts its maximum force. As shown in the drawings, one starting-spring and bell-crank lever are made to serve for both reverser-switch cylinder and series-multiple-switch cylinder, with two links from the bell-crank lever, one to one cylinder and the other to the other cylinder. One end of each of the links is slotted, so that either cylinder can be returned to open position by the centralizing-spring independently of the other cylinder, as might be desirable for safety in event of one of the cylinders becoming stuck in its operated position through the welding of a contact or other cause. This safety may also be insured by providing each cylinder with a starting-spring lever and link independently of the spring-lever and link for the other cylinder. By using one spring for both the simultaneous starting of both cylinders is insured, so that the main-motor circuits will be simultaneously broken at contact-points on both cylinders and the tendency to arc correspondingly reduced. It will be seen by reference to Figs. 10 and 11 that the connection of the starting-spring with the cylinders is such that it will act to return both simultaneously, whether they have been operated in the same or in opposite directions. The electrical connections are such that the reverser-switch and series-multiple switch are always operated together, and the coils by which they are operated are always in the same circuit in series, so that both will be simultaneously released on breaking the circuit through the coils at any point.

*Pilot mechanism.*—The pilot mechanism as constructed in practice is shown in Figs. 4 to 7. It consists of a cylinder made up of four sections, which may be called, respectively, the "rheostat-section," the "pilot-motor section" or the "limit-switch section," the "throw-over coils section," and the "throw-over coils cut-out switch-section," or, briefly, the "cut-out switch-section." To prevent a stoppage of the cylinder at a point where a contact would be in danger of arcing, the shaft of the cylinder has a notched wheel thereon. A roller on the end of a spring-pressed pawl engages the notches. These notches are located at the proper points for the safe stoppage of the cylinder. In order to enable the pawl to position the cylinder at these points, it is driven through a yielding coupling, the parts of which are separated by compression-springs. One of the parts is fastened to the shaft of the cylinder, and the other part is fastened to the shaft of a worm-wheel, which is driven by a worm on the shaft of the pilot-motor. The pilot-motor has a movement of continuous character, except as it is modified by the operation of the operator's switch or master-controller, or pilot-motor limit circuit-openers on the pilot-motor section of the cylinder, or by the throttle, to be hereinafter described. It will thus be seen that in this mechanism there is a driving and a driven mechanism, a spring connected with limited movement between the two, means for holding the driven mechanism fast until the driving mechanism has advanced a definite amount, and means for centering and holding the driven mechanism at definite points of its advance.

*Train line and couplers.*—As shown in the drawings, the controlling-wires are collected in a cable which is branched at each end of each car to couplings of like character at each side at each end, so that the coupling between cars can be effected at convenience at either side of the train. The coupling is effected through short sections of cable with couplings pairing with the couplings at the ends of the cars. These are known as "jumpers." These, with the cables of controlling-wires running from end to end on each car, constitute the train-line.

*Train line and couplers.*—In a train made up of a number of cars the corresponding controlling-wires of the several cars must be coupled together, so that if current is turned into any train-wire at any platform-switch it will cause the mechanism on each car of the train to operate in the same sense as that on the other cars relatively to the speed and direction of travel of the train—that is, there must be reversible train connections for the governing systems of the different cars. In considering the conditions necessary to secure this reversibility the controlling-wires will be classed in two groups which must be treated differently. In one group are the speed-controlling wires, which are the two wires 3 and 1 for bringing the motors into series and multiple relation, respectively. In the other group are the direction-controlling wires, which are the two wires 2 and 4 for effecting the connection of the motors for movement of the train ahead and back, respectively. The speed-controlling wires must be coupled together in the same way irrespective of the end relation of any car in the train, and the direction-controlling wires of any car must be reversed in the train system when the car is turned end for end in the train. Therefore the terminals of the wires at the abutting ends of the cars must be properly paired. As shown, the pairing is secured by properly positioning the terminals so that the connections of the speed-controlling wires will not be exchanged and the connections of the direction-controlling wires will be exchanged when the car is turned end for end. This proper positioning of the terminals is secured by arranging the terminals so that if in any coupling of any car—say the coupling U' at the right-hand side of the rear end when facing this end—the terminals be compared with the coupling U³ in the corresponding position at the front end—say at the right-hand side when facing that end—the terminals of the corresponding speed-controlling wires will be found to occupy corresponding positions, and the terminals of the two direction-controlling wires will be found to occupy exchanged positions. These couplings thus compared occupy diagonal positions on the car. This is graphically illustrated in Fig. 1, in which the four couplings, one at each side at each end, are shown in perspective. On comparing the diagonal couplings U' and U³ it will be seen that the terminal of the series-controlling wire 3 occupies the bottom position in both couplings, and the terminal of the multiple-controlling wire 1 occupies the top position in both couplings. The terminal of the ahead-direction-controlling wire 2 is at the left in the coupling U' when facing this coupling and is at the right in coupling U³ when facing that coupling. These terminals are thus exchanged in position in the corresponding couplings at the two ends of the car with the terminals of the other direction-controlling wire 4.

The train-line couplings attached to the car are of like mechanical construction. Each consists of a hollow cylindrical casing 30, in one end of which a wooden block 31 is tightly fitted. Terminal plugs 32, to which the controlling-wires are soldered, are supported by this block. They are protected by the front of the cylindrical casing and a cover 33, which is closed by a spring 34. The cover is provided with a projection 35, which serves as a latch to engage and hold in place the coupling on the jumper when it is inserted. The casing is provided with flanges, by which it is bolted to the under side of the car-platform. The back end of the casing is threaded to receive a cap 36, which protects the soldered connections between the ends of the wires in the cable and the terminal plugs. The couplings on each end of each jumper are of like mechanical construction, so that any coupling on any jumper will pair with any coupling on any car. Each consists of a sleeve 37, in which a wooden block 38 is tightly fitted. Sockets 39, which fit the plugs of the other coupling, are supported in this block and are connected by wires which lead parallel through the jumper to the sockets in the coupling at the other end. A key on one side of the sleeve 37 enters a keyway in the casing of the other coupling, so that the two can be put together in but one way. The back end of the sleeve of this coupling is threaded to receive a cap 41, which protects the wire connections. On the cap is a projection 42, which is engaged by the latch on the cover of the coupling U to hold the couplings together. The points on the abutting end of the cars where the couplings are attached have a movement to and from each other of nearly three feet when the train is passing around curves, and in passing between straight and curved track there will be times when the abutting platforms will be displaced laterally with respect to each other. The connecting-cable of the jumper must be of sufficient length to reach without being drawn too tight when the ends are at their maximum distance apart; but it cannot be much longer than is necessary, for if too long it will at times sag sufficiently to touch either the third rail or the track-rails. In adjusting itself to these various conditions the jumper must have considerable flexibility, and its places of greatest flexure will naturally be adjoining the couplings. In order to keep the flexure at these places from being great enough to injure the wires in the jumper, the couplings are inclined downward at an angle of about forty-five degrees, which is about midway between the angles which the cable would naturally assume at a short distance from the points of juncture to the couplings under the varying conditions which arise in practice. When the couplings are set at forty-five degrees, the cable will sometimes bend upward and sometimes downward from the axis of the coupling. The flexure at these places is prevented from being too great by extending from the back of the coupling a bell-mouth guide 43 of a curvature to which the cable can be safely bent.

Instead of having a separate shunt around the field-coil of the motors there may be two field-coils wound in the same direction and in parallel, but one of finer wire and many more turns than the other. Such an arrangement will result in maintaining the field and diminishing arcing in substantially the same manner as the arrangement above described.

While for clearness the switch C has been referred to as a "series-multiple" switch, other circuit-changing schemes could be substituted therefor and operated by the instrumentality shown or obvious modifications.

In the following claims by "a system of secondary motor control" is meant a system in which the contacts in the main-motor circuits are operated by devices connected with a controlling circuit or circuits — that is, the main-motor circuits are relayed. In the foregoing statement the term "relayed" is used in a broad sense and is not limited to specific constructions of the relay devices.

It is obvious that many changes may be made without departing from the spirit of my invention.

Therefore without limiting myself to the details shown, what I claim is—

1. In an electrical train system, the combination of translating devices, circuits therefor, a governing train-line independent of the other circuits provided with two pairs of controlling-wires, and means for closing circuits through a wire of one pair and a wire of the other pair simultaneously, substantially as described.

2. In an electrical train system, the combination of translating devices, circuits therefor, a governing train-line independent of the other circuits provided with two pairs of controlling-wires, means for closing circuits through one of the wires of one pair and a wire of the other pair simultaneously, and means for closing circuits through the other wire of the first pair and one of the wires of the second pair simultaneously, substantially as described.

3. In an electrical train system, the combination of translating devices, circuits therefor, a governing train-line independent of the other circuits provided with two pairs of controlling-wires, means for closing circuits through one of the wires of one pair and either of the wires of the other pair simultaneously, and means for closing circuits through the other wire of the first pair and one of the wires of the second pair simultaneously, substantially as described.

4. In a system of secondary motor control, the combination of two pairs of conductors, motor-controlling means controlled by these four conductors, and means for connecting in series in a circuit either conductor of one pair with either conductor of the other pair, substantially as described.

5. In a system of secondary motor control, the combination of two pairs of conductors, motor-controlling means controlled by these four conductors, means for connecting either conductor of one pair in series with either conductor of the other pair, and means for preventing the simultaneous connection in circuit of the two conductors of one pair, substantially as described.

6. In a system of secondary motor control, the combination of two pairs of conductors, motor-controlling means controlled by these four conductors, the two conductors of each pair being normally open at one end, means for connecting in a circuit either conductor in one pair in series with either conductor in the other pair, and means for preventing the simultaneous closure through the conductor of one pair and both of the conductors of the other pair, substantially as described.

7. In a system of secondary motor control, the combination with a pair of motor-reversing wires and a pair of motor-grouping wires, of means for connecting either wire of one pair in a circuit in series with either wire of the other pair, substantially as described.

8. In a system of secondary motor control, the combination of a pair of motor-reversing wires and a pair of motor-grouping wires, means for connecting either wire of one pair in series with either wire of the other pair, and means governed by the closure of a circuit through a reversing and motor-grouping wire for preventing simultaneous connection of the two grouping-wires with a reversing-wire, substantially as described.

9. In a system of secondary motor control, the combination of a pair of motor-reversing wires and a pair of wires for effecting series and multiple relations, respectively, of the motors, either of which motor-reversing wires may be connected with either of the motor-grouping wires for effecting desired grouping of the motors, and means for determining circuit connections consisting of two parts, one of the parts for selecting the one or the other of the direction-controlling wires, and the other part for selecting the motor-grouping wire to be placed in series therewith, substantially as described.

10. In an electrical train system, the combination of a plurality of motor equipments, governing devices for grouping the motors in each equipment in series and multiple relation, and a train-line containing two wires for controlling the direction of motor movement, either of which wires may be connected with either of the motor-grouping devices for effecting the desired grouping of the motors, substantially as described.

11. In an electrical train system, the combination of a plurality of motor equipments, governing devices for grouping the motors in each equipment in series and multiple relation, and a train-line containing two wires for controlling the direction of motor movement, either of which wires may be connected with either of the motor-grouping devices for effecting the desired grouping of the motors, and a circuit-changer for determining circuit connections, substantially as described.

12. In an electrical train system, the combination of a plurality of motor equipments, governing devices for grouping the motors in each equipment in series and multiple relation, a train-line containing two wires for controlling the direction of motor movement, either of which wires may be connected with either of the grouping devices for effecting the desired groupings of the motors, and means for determining circuit connections consisting of two parts, one of the parts for selecting the one or the other of the direction-controlling wires, and the other part for selecting the motor-grouping device to be energized, substantially as described.

13. In a system of secondary motor control, the combination of coils for effecting reversal of the motors, coils for effecting grouping of the motors in series and multiple relation, two controlling-wires, each of which energizes a reverser-coil and one or other of the grouping-coils, and a circuit-changer for selecting which of the grouping-coils shall be energized, substantially as described.

14. In a system of secondary motor control, the combination of coils for effecting a reversal of the motors and coils for effecting grouping of the motors in series and multiple relation, two controlling-wires, each of which energizes a reverser-coil and one or other of the motor-grouping coils, and means for determining circuit connections consisting of two independent parts, one of the parts for selecting the reverser-coil, and the other part for selecting the motor-grouping coil to be energized, substantially as described.

15. The combination of a current-varying controller, which comprises a resistance-controller and means for determining circuit connections, these parts being independently movable, means moving with each part for operating the controller, and means for securing coöperative action of the parts of the controller, substantially as described.

16. The combination of a current-varying controller, which comprises a resistance and means for determining circuit connections, means for operating the controller, and a circuit-interrupter to secure coöperative action of the parts of the controller, substantially as described.

17. The combination of a current-varying controller, which comprises a resistance, and means for determining circuit connections, means for operating each of these parts of the controller, and a circuit-interrupter to secure the coöperation of the parts of the controller, the circuit-interrupter being driven with one of the parts of the controller, substantially as described.

18. The combination of a current-varying controller, which comprises a rheostat, and means for determining circuit connections, means for operating each of these parts, and a circuit-interrupter to secure coöperation of the above-named parts of the controller, the circuit-interrupter being operated with the rheostat, substantially as described.

19. In an electrical train system, the combination of a motor equipment, a controller therefor having reversing, rheostatic and series-multiple grouping parts, and an independent governing-line having two sets of controlling-wires, one for controlling the reversing and motor-grouping parts of the controller and the other for controlling the rheostatic part thereof, substantially as described.

20. In an electrical train system, the combination of a motor equipment, a controller therefor having reversing, rheostatic and series-multiple grouping parts, and an independent governing-line, having two sets of controlling-wires for the controller, one set for closing the circuit of the motors through the reversing and motor-grouping parts of the controller with resistance in the motor-circuit, and the other set for varying the resistance in the motor-circuit, substantially as described.

21. In an electrical train system, the combination of a motor equipment, governing devices for reversing and for grouping the motors in series and multiple relation and for effecting changes in the resistance of the motor-circuit, a governing-line containing two independent sets of wires, one set for effecting variations in resistance in the motor-circuits, and two of the wires of the other set for controlling the direction of motor movement, either of which directional wires may be connected with either of the grouping devices for effecting the desired grouping of the motors, and a circuit-changer for determining the circuit connections, substantially as described.

22. In an electrical train system, the combination of a motor equipment, governing devices for grouping the motors in series and multiple relation, and for effecting changes in the resistance of the motor-circuit, and a train-line containing two independent sets of wires for controlling the governing devices, two of the wires of one set being directional wires for controlling the direction of motor movement, either of which may be connected with either of the grouping devices for effecting the desired grouping of the motors, and means for determining circuit connections consisting of two independent parts, one of the parts for selecting the one or the other of the direction-controlling wires and the other part for selecting the motor-grouping device and effecting variation in resistance, substantially as described.

23. In a system of secondary motor control the combination of a motor equipment, a controller therefor consisting of reversing, series-multiple and rheostatic parts and a governing train-line for the controller consisting of two sets of wires, one set for closing circuit to the motors through the reverser and series-parallel parts of the controller and a full resistance, and the other set for varying the resistance, substantially as described.

24. In a system of secondary motor control, the combination of a motor equipment, a controller therefor having coils for effecting grouping of the motors in series and multiple relation respectively and means for effecting changes of resistance in the motor-circuit, and a governing-line having three sets of controlling-wires therein, one set for controlling the direction of rotation of the motors and energizing the series and multiple coils, another set for determining which of the series and multiple coils shall be energized, and a third and independent set for controlling the resistance in the motor-circuit, substantially as described.

25. In an electrical train system, the combination of motor equipments, controllers therefor having switches for establishing series and parallel relation of the motors and circuit-breakers in series therewith, and a controlling-circuit common to the grouping-switches and the circuit-breakers, substantially as described.

26. In an electrical train system the combination of motor equipments, controllers therefor having motor-grouping switches for establishing series and multiple relation of the motors, and circuit-breakers in series therewith, a controlling-circuit common to the grouping-switches and the circuit-breakers, and an independent controlling-circuit for effecting variations in the resistance in the motor-circuits, substantially as described.

27. In a system of secondary motor control, the combination of a motor-controller having separably-movable reversing, grouping and rheostatic parts, and a train-line having direction-controlling wires and speed-controlling wires, the direction-controlling wires also energizing the motor-grouping parts of the controller for effecting grouping of the motors, and the speed-controlling wires determining the grouping of the motors and the resistance of the motor-circuit, substantially as described.

28. In a train with equipped cars, the combination of a pair of motor-reversing wires and a pair of motor-grouping wires for each car, and means, including an independent governing train-line, for connecting either wire of one pair on each car in series with either wire of the other pair on the same car, substantially as described.

29. In a train with equipped cars, the combination on each equipped car of motors, a controller individualized as to each car for reversing the motors and for grouping them in series and parallel relation, and a governing train-line containing two wires for controlling the direction of motor movements, either of which may be connected with either of the motor-grouping devices for effecting the desired grouping of the motors, substantially as described.

30. In a train with equipped cars, the combination of motors on each equipped car, a controller individualized as to each car, having separably-movable reversing, rheostatic, and series-multiple grouping parts, and an independent governing train-line having two sets of controlling-wires, one set for controlling the reversing and motor-grouping parts of each controller, and the other set for controlling the rheostatic part of each controller, substantially as described.

31. In an electrical train system the combination of motor-equipments, controllers therefor comprising circuit-breakers and switches for grouping the motors in series and multiple relation, actuating-coils for the grouping-switches, and a controlling-circuit for the circuit-breakers including therein either the series or multiple actuating-coils, and contacts in the controlling-circuits controlled by the current therethrough, substantially as described.

32. The combination of a current-varying controller, which comprises a resistance and means for determining circuit connections, means for operating each of these means including a pilot-motor for operating the resistance, and a circuit-interrupter to secure the coöperation of the above-named parts of the controller, the circuit-interrupter being driven by the pilot-motor, substantially as described.

33. The combination of a motor equipment, a current-varying controller therefor which comprises a resistance-controller and means for determining the connections of the motor equipment, these parts being independently movable, means for operating each of these parts of the controller, and means moving with each part for securing coöperative action of the parts of the controller, substantially as described.

34. The combination of a motor equipment, a current-varying controller therefor which comprises a resistance and means for determining the connections of motor equipment, means for operating each of these parts of the controller, and a circuit-interrupter for securing coöperative action of the parts of the controller, substantially as described.

35. The combination of a motor equipment, a current-varying controller therefor which comprises a resistance and means for determining the connections of the motor equipment, means for operating each of these parts of the controller, and a circuit-interrupter for securing coöperation of the parts of the controller, the circuit-interrupter being driven with one of the parts of the controller, substantially as described.

36. The combination of a motor equipment, current-varying controllers therefor which comprise a resistance and means for determining the connections of the motor equipment, means for operating each of these parts of the controller, including a pilot-motor, and a circuit-interrupter for securing coöperation of the parts of the controller, the circuit-interrupter being driven by the pilot-motor, substantially as described.

37. A train system comprising a plurality of motor equipments, current-varying controllers therefor, which include a resistance and means for determining circuit connections for each motor equipment, these parts being independently movable, means for operating the parts of each controller, and means for securing coöperative action of the parts of each controller, substantially as described.

38. A train system comprising a plurality of motor equipments, current-varying controllers therefor, which include a resistance and means for determining circuit connections for each motor equipment, these parts being independently movable, means for operating the parts of each controller, and means for securing coöperative action of the parts of all of the controllers, substantially as described.

39. A train system comprising a plurality of motor equipments, current-varying controllers therefor, which include a resistance and means for determining the connections for each motor equipment, means for operating these parts of each controller, and a circuit-interrupter for securing coöperative action of the parts of each controller, substantially as described.

40. A train system comprising a plurality of motor equipments, current-varying controllers therefor, which include a resistance and means for determining the connections for each motor equipment, means for operating each of these parts of each controller, and a circuit-interrupter for securing coöperative action of the parts of each controller, the circuit-interrupter being driven with one of the controllers, substantially as described.

41. A train system comprising a plurality of motor equipments, current-varying controllers therefor including a resistance and means for determining the connections for each motor equipment, means for operating each of these parts of each controller, including a pilot-motor, and a circuit-interrupter for securing coöperation of the parts of the controller, the circuit-interrupter being driven by the pilot-motor, substantially as described.

42. The combination of a motor equipment, a current-varying controller therefor which comprises a resistance and means for determining the circuit connections of the equipment, means for operating these parts of the controller, including a pilot-motor for operating the resistances, and a circuit-interrupter driven by the pilot-motor for securing coöperative action of the parts of the controller, substantially as described.

43. The combination of a rheostat, a switch for operating it, means independent of the switch for interrupting the movement of the rheostat at a plurality of definite running positions, and means for opening the circuit while the rheostat is passing from one definite position to another, substantially as described.

44. The combination of a rheostat and a series-multiple switch, means for setting the series-multiple switch for series connection, means for cutting out the resistance of the rheostat, means for opening the circuit, means for throwing in resistance at the rheostat, and means for closing the series-multiple switch for multiple connection, substantially as described.

45. The combination of a rheostat and a series-multiple switch, means for setting the series-multiple switch for series connection, means for cutting out the resistance of the rheostat, means for opening the series-multiple switch, means for throwing in resistance in the circuit, and means for closing the series-multiple switch for multiple connection, substantially as described.

46. The combination of a rheostat and a series-multiple switch, means for setting the series-multiple switch for series connection, means for cutting out the resistance of the rheostat and automatically stopping it, means for opening the circuit, means for throwing in resistance at the rheostat, and means for closing the series-multiple switch for multiple connection, substantially as described.

47. The combination of a rheostat and a series-multiple switch, means for setting the series-multiple switch for series connection, means for cutting out the resistance of the rheostat and automatically stopping it, means for opening the series-multiple switch, means for throwing in resistance at the rheostat, and means for closing the series-multiple switch for multiple connection, substantially as described.

48. The combination of a rheostat and a series-multiple switch, a switch for operating them, means independent of the switch for interrupting the movement of the rheostat at a plurality of definite positions, and means for opening the circuit at the series-multiple switch while the rheostat is passing from one definite position to another position, substantially as described.

49. The combination of a rheostat, a switch for operating it, means independent of the switch for interrupting the movement of the rheostat at a definite position, means for starting the rheostat again in the same direction by operation of the switch, means independent of the switch for opening the circuit while the rheostat is passing to another position, and means independent of the switch for again interrupting the movement of the controller at second definite position, substantially as described.

50. The combination of a current-varying controller comprising a rheostat and a series-multiple switch, means for moving the rheostat at will from one limit to another, means for moving the rheostat to a definite intermediate position and automatically stopping it there, means for continuing the movement of the rheostat in the same direction to its limit, and means for opening the circuit controlled by the controller at the controller while it is passing from the intermediate position to its limiting position, substantially as described.

51. A rheostat provided with a movable member, electrically-actuated mechanism for moving it to any one of a plurality of definite current-varying positions, and for maintaining it in the position to which it may be moved, and means for restoring it to opening position, all movements being in the same direction, substantially as described.

52. A rheostat provided with contacts, a cylinder, electrically-actuated mechanism for moving it to any one of a plurality of definite current-varying positions and for maintaining it in the position to which it may be moved, and for restoring it to open position, all movements being in the same direction, substantially as described.

53. The combination of a current-varying controller provided with a movable cylinder and means electrically controlled for effecting movement of the controller to one or more definite running positions, and for effecting movement of the controller in the same direction to release or off position, substantially as described.

54. The combination of a plurality of motors or motor equipments, current-varying controllers therefor, a suitable circuit, means electrically controlled thereby for effecting advance movement of the controllers in one direction to definite running positions or to release or off position, substantially as described.

55. The combination of a motor, a controller therefor, an operator's switch, means connected therewith for operating the controller from its initial position, and means independent of the operator's switch for restoring the controller to initial position by further movement in the same direction, substantially as described.

56. The combination of one or more operator's switches, each provided with a plurality of contacts, one or more motor equipments and circuits and current-varying controllers therefor, a plurality of sets of contacts on each of the controllers, means for closing each of the controllers at one set of contacts by closing the operator's switch at one of its contacts, means for opening the circuit at each controller, and then closing the controller at another set of contacts by closing the operator's switch at another of its contacts, substantially as described.

57. The combination of one or more operator's switches, each provided with a plurality of contacts, one or more motor equipments and circuits and current-varying controllers therefor, a plurality of sets of contacts on each of the controllers, means for closing each of the controllers at one set of contacts by closing the operator's switch at one of its contacts, means for opening the circuit at each controller and then closing the controller at another set of contacts by closing the operator's switch at another of its contacts, and means for automatically holding the controller at the different sets of contacts, substantially as described.

58. The combination of a motor to drive a car, a suitable system of circuits for operating the motor, including a current-varying controller which embraces a rheostat, pilot mechanism for the controller, connections for operating the pilot mechanisms which cause increased speed of the motor, and connections operated by the current-varying controller for operating the pilot mechanisms to restore the rheostat to initial or off position, substantially as described.

59. The combination of motors to drive a car, a suitable system for operating the motors, including a current-varying controller which embraces a rheostat, reverser-switch and series-multiple switch, pilot mechanism for the rheostat, connections for operating the pilot mechanisms to cause increase of speed of the motors, and connections operated by the current-varying controller for operating the pilot mechanism to restore the rheostat to initial or off position, substantially as described.

60. A train with cars individually equipped with motors and current-varying controllers including a rheostat, an operator's switch for operating the same, means including contacts in the controllers for restoring the rheostats to initial position independently of the operator's switch, substantially as described.

61. The combination of a rheostat, a series-multiple switch and a reverser-switch, each separately movable, means for operating these parts, and a switch for securing coöperative action thereof, substantially as described.

62. The combination of a rheostat, a reverser-switch and a series-multiple switch, means for operating these parts, and a circuit-changer for securing coöperative action thereof, substantially as described.

63. The combination of a rheostat, a reverser-switch and series-multiple switch, means for operating these parts, and a circuit-interrupter driven with the rheostat for securing coöperative action of the parts, substantially as described.

64. The combination of a rheostat, a series-multiple switch, a reverser-switch, means for operating these parts, including pilot mechanisms for operating the rheostat, and a circuit-interrupter operated by the pilot-motor, for securing coöperative action of these parts, substantially as described.

65. The combination of a rheostat, a reverser-switch and a series-multiple switch, a pilot-motor for operating the rheostat, a circuit-interrupter operated by the pilot-motor and including a limit-switch therefor, for securing coöperative action of the rheostat, reverser-switch and series-multiple switch, substantially as described.

66. The combination of a rheostat, a reverser-switch and a series-multiple switch, means for closing the reverser-switch and series-multiple switch for series connection in either direction, means for cutting out the resistance of the rheostat, means for opening the series-multiple switch and reverser-switch, means for throwing in resistance of the rheostat, and means for closing the series-multiple switch and the reverser-switch, for multiple connection in the same direction, substantially as described.

67. The combination of a plurality of cars, driving-motors therefor and circuits for the motors, a relay train-circuit, rheostats, series-multiple and reversing switches for the motors operated through the relay-circuit, and means for opening the motor-circuits at the reverser and series-multiple switches upon the current being cut off from the relay-circuit, substantially as described.

68. The combination of a motor, a motor-circuit, a rheostat for the motor, an operator's switch or master-controller for operating the rheostat through an independent governing-circuit to advance it to different running positions, means automatically operated for opening the motor-circuit independently of the rheostat, and means for restoring the rheostat by movement in the same direction as above, toward or to off position, independently of the operator's switch or master-controller, substantially as described.

69. The combination of motors, motor-circuits, rheostats for the motors, and a governing-circuit independent of the motor-circuits for operating the rheostats to advance them to different running positions, means automatically operated for opening the motor-circuits independently of the rheostats, and means for automatically restoring the rheostats toward or to off position by movement in the same direction as above, substantially as described.

70. A train with two or more individually-equipped cars and means on each car for controlling all of the cars simultaneously, a reverser-switch, a series-multiple switch and a rheostat, and means including contacts on the reverser-switch and the series-multiple switch for restoring the rheostat to release or off position upon the opening of the circuit, substantially as described.

71. A train with cars individually equipped with motors, a rheostat, a reverser-switch and series-multiple switch, a switch for operating the same, means including contacts in the reverser-switch and series-multiple switch for restoring the rheostat to initial position independently of the operating-switch, upon the opening of the circuit, substantially as described.

72. The combination of main circuits, rheostats therein, a governing-line, one or more operator's switches connected therewith, means for advancing the rheostats to different running positions, means for opening the train-line, relay mechanisms connected therewith for opening the main circuits, means for automatically restoring the rheostats toward or to off position by movement in the same direction as above, and means for preventing the closure of the main circuits or train-line after the opening thereof, until the rheostats have been restored toward or to off position, substantially as described.

73. The combination of main circuits, rheostats therein, a governing train-line, one or more operator's switches connected therewith, means for advancing the rheostats to different running positions, means for opening the train-line, relay mechanisms connected therewith for opening the main circuits, means for automatically restoring the rheostats toward or to off position by movement in the same direction as above, and means for preventing the closure of the train-line or main circuits and the further advance of the rheostats until the rheostats are restored toward or to off position, substantially as described.

74. The combination of a motor, a motor-circuit, a current-varying controller for the motor, an operator's switch and circuit for operating the controller, means for opening the motor-circuit in the controller, means for restoring the controller toward or to off position independently of the operator's switch, and a cut-out switch connected with the controller and closed in certain positions thereof, which, when the controller has been restored to open position, restores control of the controller to the operator's switch, substantially as described.

75. The combination of a governing-circuit one or more operator's switches connected therewith, a current-varying controller or controllers, means controlled from each operator's switch through the governing-circuit for operating the controller or controllers, means for opening the main circuits at the controllers immediately upon opening the operator's switch, means for restoring the controller or controllers to initial or off position, irrespective of further movement of the operator's switch, and means for restoring control of each controller to the operator's switch when the controller has been restored to initial or off position, substantially as described.

76. The combination of a governing train-line, one or more operator's switches connected therewith, a current-varying controller or controllers, means controlled from each operator's switch through the governing train-line for operating the controller or controllers, means for opening the main-motor circuits at the controllers immediately upon opening the operator's switch, means for restoring the controllers to initial or off position, irrespective of further movement of the operator's switch, means for restoring control of each controller to the operator's switch when such controller has been restored to its initial position, substantially as described.

77. The combination of motors, motor-circuits and current-varying controllers for the motors, one or more operator's switches, and a circuit for operating the controllers, means for opening the motor-circuits at the controllers, means for restoring the controllers independently of the operator's switches to initial or off position, and cut-out switches connected with the controllers and closed in certain positions thereof, which when closed restore control of the controllers to the operator's switches, substantially as described.

78. The combination of a motor, a rheostat, a series-multiple switch and a reverser-switch therefor, a circuit through which these parts are operated, a cut-out switch, which is included in the circuit for operating them in a definite position or positions of the rheostat, and a shunt around the cut-out switch through the controller and reverser, which is closed in certain definite positions of these parts, substantially as described.

79. A car equipped with a motor to drive it, an electrically-operated current-varying controller and reverser for the motor, a train-line made up of two distinct pairs of wires, and reversible train connections for the train-line, substantially as described.

80. A car provided with an independent governing-line containing a pair of direction-controlling wires which terminate in similar groups at each end of the car, the terminals of the wires in the group at one end being exchanged, as compared with their terminals in the group at the other end, and a pair of speed-controlling wires which terminate in similar groups at each end of the car without being so exchanged, substantially as described.

81. A car provided with a motor or motors, current-varying controllers and reverser therefor, a relay or governing circuit for said controller and reverser having a pair of direction-controlling and a pair of speed-controlling wires terminating in similar groups at each end of the car, the terminals of the direction-controlling wires in the group at one end being exchanged, as compared with their terminals in the group at the other end, substantially as described.

82. A car provided with a pair of speed-controlling wires, and a pair of direction-controlling wires, which terminate in similar groups at each end of the car, the terminals of the direction-controlling wires in the group at one end being exchanged, as compared with their terminals in the group at the other end, and the terminals of the speed-controlling wires corresponding in position at both ends, substantially as described.

83. A train consisting of interchangeable cars, each of which is provided with a pair of direction-controlling wires, which terminate in similar groups at each end of each car, the terminals of the wires in the group at one end being exchanged, as compared with the terminals in the group at the other end, and a pair of speed-controlling wires, the terminals of the speed-controlling wires corresponding at both ends, and means for connecting like direction-controlling wires and like speed-controlling wires at the abutting ends of the car, substantially as described.

84. In a car equipped with a plurality of motors, the combination of a controller therefor having motor-reversing, motor-grouping, and rheostatic parts, and a controlling-line having direction-controlling wires and speed-controlling wires, the direction-controlling wires also actuating the motor-grouping parts of the controller for effecting series and multiple relation of the motors, and the speed-controlling wires determining the grouping of the motors and resistance of the motor-circuit, the direction-controlling wires terminating at similar groups at each end of the car, and the terminals of the wires in the group at one end being exchanged as compared with their terminals at the other end, and the speed-controlling wires terminating in similar groups at each end of the car, without being exchanged, substantially as described.

85. In an electrical train system, the combination of translating devices and circuits therefor, one or more reverser-switches, and one or more series-multiple switches in the circuits, and a governing train-line with two sets of train-wires, a circuit-interrupter, means for controlling the reversers and series-parallel switches connected with the first set of train-wires, and means for controlling the circuit-interrupter connected with the second set of train-wires, substantially as described.

86. In an electrical train system, the combination of translating devices and circuits therefor, one or more reverser-switches and series-multiple switches, and one or more rheostats to be operated in conjunction with the switches, a governing train-line having two sets of train-wires, a circuit-interrupter, means for controlling the reverser-switches and series-multiple switches connected with one set of train-wires, and means for controlling the circuit-interrupters and rheostats connected with the other set of train-wires, substantially as described.

87. The combination of a series-multiple switch and a reverser-switch each having a normal open-circuit off position, and means for moving these switches independently of each other, in the same or in opposite directions to each other, substantially as described.

88. The combination of a series-multiple switch and a reverser-switch, the series-multiple switch having a normal circuit off position intermediate its positions for closing the circuit in series and multiple, and means for moving the two switches in the same or in opposite directions at will, substantially as described.

89. The combination of a rheostat-cylinder, a pilot-motor for operating it, limit-switches for the pilot-motor operated with the cylinder, and a circuit-interrupter, also operated with the cylinder, substantially as described.

90. The combination of a circuit-changing device, a series motor, and a permanent shunt around the field-coil of the series motor for the purpose of holding the field and reducing the arc in breaking, substantially as described.

91. The combination of a circuit-changing device, a series motor with laminated field and a permanent shunt around the field-coil of the motor for holding the field and reducing the arc in breaking, substantially as described.

92. The combination of a pair of series motors, a series-multiple switch therefor, means for breaking the circuit in passing from series to multiple without the introduction of resistance, and a permanent shunt around the field-coil for each of the motors for the purpose of holding the field and reducing the arc in breaking, substantially as described.

93. The combination of an operator's switch, a train-line and a car system, and switches whereby all of them can be connected together, and any one be disconnected without disconnecting the others, substantially as described.

94. In a train system, the combination of a train-line and car systems, the train-line being made up of a plurality of wires and the car systems being connected to the train-line in multiple to each other, a current-varying controller in each car system, means operated through different wires of the train system for bringing all of the controllers to two definite positions other than the open position, the line connection when one of the wires is operated being made through a relay, substantially as described.

95. In a system of secondary motor control, the combination of motors, coils for effecting reversal of the motors, coils for effecting grouping of the motors in series or multiple relation, two controlling-wires each of which energizes a reverser-coil and one or other of the grouping-coils, a circuit-changer for selecting which of the grouping-coils shall be energized, and a throttle which controls the movement of the circuit-changer, substantially as described.

96. In the system of secondary motor control, the combination of motors, coils for effecting reversal of the motors and coils for effecting grouping of the motors in series and multiple relation, two controlling-wires, each of which energizes a reverser-coil and one or other of the motor-grouping coils, means for determining the circuit connections consisting of two independent parts, one of the parts for selecting the reverser-coil and the other part for selecting the motor-grouping coil to be energized, and a throttle which controls the movement of the last-named part, substantially as described.

97. In a system of secondary motor control, the combination of motors, a main motor-circuit, reversing and grouping switches for the motors, actuating-coils for both the reversing and grouping switches, and a controlling-circuit including in series an actuating-coil for each of these switches, and maintained through contacts controlled by the reversing-switch, substantially as described.

98. In a system of secondary motor control, the combination of motors, a main motor-circuit, reversing and grouping switches for the motors, actuating-coils for both the reversing and grouping switches, and a controlling-circuit including in series an actuating-coil for each of these switches, and maintained through contacts controlled by the grouping-switch, substantially as described.

99. In a system of secondary motor control, the combination of motors, a main motor-circuit, reversing and grouping switches for the motors, actuating-coils for both the reversing and grouping switches, and a controlling-circuit including in series an actuating-coil for each of these switches, and maintained through contacts controlled by the reversing and grouping switches, substantially as described.

Signed by me in New York city, borough of Manhattan, this 15th day of December, 1898.

FRANK J. SPRAGUE.

Witnesses:
SAMUEL W. BALCH,
GEORGE H. GILMAN.